(12) United States Patent
LeBaillif et al.

(10) Patent No.: US 9,862,293 B2
(45) Date of Patent: Jan. 9, 2018

(54) SEAT FOR VEHICLE

(71) Applicant: NEXTER SYSTEMS, Roanne (FR)

(72) Inventors: David LeBaillif, Bourges (FR); Sébastien Carrie, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 104 days.

(21) Appl. No.: 14/902,711

(22) PCT Filed: Jul. 10, 2014

(86) PCT No.: PCT/FR2014/051778
§ 371 (c)(1),
(2) Date: Jan. 4, 2016

(87) PCT Pub. No.: WO2015/011363
PCT Pub. Date: Jan. 29, 2015

(65) Prior Publication Data
US 2016/0167549 A1    Jun. 16, 2016

(30) Foreign Application Priority Data

Jul. 22, 2013    (FR) ..................................... 13 01760

(51) Int. Cl.
*A47C 1/00*    (2006.01)
*B60N 2/44*    (2006.01)
(Continued)

(52) U.S. Cl.
CPC ............... *B60N 2/442* (2013.01); *B60N 2/10* (2013.01); *B60N 2/24* (2013.01); *B60N 2/4242* (2013.01);
(Continued)

(58) Field of Classification Search
CPC ............ B60N 2/24; B60N 2/242; B60N 2/42; B60N 2/442; B60N 2/10; B60N 2/42709;
(Continued)

(56) References Cited

U.S. PATENT DOCUMENTS 4,257,626 A * 3/1981 Adomeit .............. B60N 2/4221
280/805
5,125,598 A * 6/1992 Fox ...................... B60N 2/4242
244/122 R
(Continued)

FOREIGN PATENT DOCUMENTS

DE    10241250 A1    4/2004
EP    0069645 A1    1/1983
(Continued)

OTHER PUBLICATIONS

Sep. 29, 2014 International Search Report issued in International Patent Application No. PCT/FR2014/051778.
(Continued)

*Primary Examiner* — Chi Q Nguyen
(74) *Attorney, Agent, or Firm* — Oliff PLC

(57) ABSTRACT

A seat for a vehicle, including a seating part pivoting about a pivot connection, a pivot connection allowing the seating part to be lowered into a substantially horizontal position or lifted against a back rest, the lowering of the seating part being limited in the course thereof by at least one first abutment that can release the lowering following an impact, the being characterized in that the seating part includes at least two adjacent panels that can carry out a fold-back movement in relation to each other about an axis parallel to the pivot connection between the seating part and the back rest in such a way as to be able to bring the upper faces of the panels towards each other.

7 Claims, 3 Drawing Sheets

(51) Int. Cl.
*B60N 2/24* (2006.01)
*B60N 2/42* (2006.01)
*B60N 2/427* (2006.01)
*B60N 2/10* (2006.01)
*F41H 7/04* (2006.01)

(52) U.S. Cl.
CPC ..... B60N 2/42709 (2013.01); B60N 2/42754 (2013.01); *B60N 2/242* (2013.01); *B60N 2/42* (2013.01); *B60N 2002/447* (2013.01); *F41H 7/04* (2013.01); *F41H 7/046* (2013.01)

(58) Field of Classification Search
CPC .............. B60N 2/42754; B60N 2/4242; B60N 2002/447; F41H 7/046; F41H 7/04
USPC ........... 297/335, 338, 216.1, 216.15; 296/64, 296/65.05, 65.02, 68.1
See application file for complete search history.

(56) References Cited

U.S. PATENT DOCUMENTS

| | | | | |
|---|---|---|---|---|
| 5,364,151 | A * | 11/1994 | Yurasits | A47C 9/06 180/326 |
| 5,558,399 | A * | 9/1996 | Serber | B60N 2/4221 297/216.1 |
| 6,394,393 | B1 * | 5/2002 | Mort | B64D 11/06 244/122 R |
| 6,439,636 | B1 * | 8/2002 | Kuo | B60N 2/34 296/65.01 |
| 6,695,378 | B2 * | 2/2004 | Hanagan | B60N 2/3031 296/65.01 |
| 7,100,991 | B2 * | 9/2006 | Schroth | B60N 2/24 280/748 |
| 7,654,602 | B2 * | 2/2010 | Smiley | B60N 2/2209 296/65.01 |
| 8,152,240 | B2 * | 4/2012 | Yamada | B60N 2/22 296/65.09 |
| 2010/0117408 | A1 * | 5/2010 | Hansen | B60N 2/24 297/216.1 |
| 2011/0074176 | A1 | 3/2011 | Bettencourt et al. | |
| 2015/0036060 | A1 * | 2/2015 | Yaghoubi | B60N 2/01 348/837 |

FOREIGN PATENT DOCUMENTS

FR 2932428 A1 12/2009
JP 2003-267101 A 9/2003

OTHER PUBLICATIONS

Sep. 29, 2014 International Written Opinion issued in International Patent Application No. PCT/FR2014/051778.

* cited by examiner

SEAT FOR VEHICLE

The technical field of the invention is the technical field of seats for vehicles, and in particular for armoured vehicles.

BACKGROUND OF THE INVENTION

The armoured vehicles are likely to undergo mine-type attacks under the floor which, even if they do not damage the vehicle structure, are likely to hurt the vehicle passengers subjected to the transmission of the impact by the seats on which they sit.

In order to limit the transmission of this strong impact to the passengers, it is known from French patent FR2932428 to use a seat whose seating part can give out under the passenger as a result of the impact. To this end, the seating part is capable of pivoting downwards after releasing calibrated stops which are dimensioned to maintain the seating part in its use and break upon an impact.

However, in cases of impact causing the seating part to pivot downward, the downward course of the seating part can be limited by objects arranged below the seating part and forming an obstacle, such as material carried or the feet of another passenger, which compromises the efficiency of the calibrated stops.

The invention is intended to solve this problem.

SUMMARY OF THE INVENTION

Thus, the invention relates to a seat for a vehicle comprising a seating part pivoting about a pivot link, the pivot link allowing the seating part to be lowered into a substantially horizontal position or lifted against a back rest, a lowering course of the seating part being limited by at least one first stop adapted to release a lowering following an impact, the seat being characterized in that the seating part includes at least two adjacent panels adapted to carry out a fold-back movement in relation to each other about an axis parallel to the pivot link between the seating part and the back rest so as to be able to bring upper faces of the panels towards each other.

Advantageously, the seat includes a second stop impeding the fold-back movement of the panels, the second stop being releasable upon impact to allow the fold-back movement.

Advantageously, the seat includes restoring means for a front panel of the two panels, the restoring means adapted to maintain the front panel substantially horizontal.

Advantageously, the restoring means includes a deformable structure.

Advantageously, the deformable structure includes a textile belt comprising several folds connected by a tear-calibrated seam.

Advantageously, the axis between both adjacent panels of the seating part includes a torsion bar.

Advantageously, a front panel has a length L lower than or equal to a third of a depth P of the seating part.

BRIEF DESCRIPTION OF THE DRAWINGS

The invention will be better understood upon reading the following description and the appended drawings, in which.

DETAILED DESCRIPTION OF THE DRAWINGS

Figure 1:
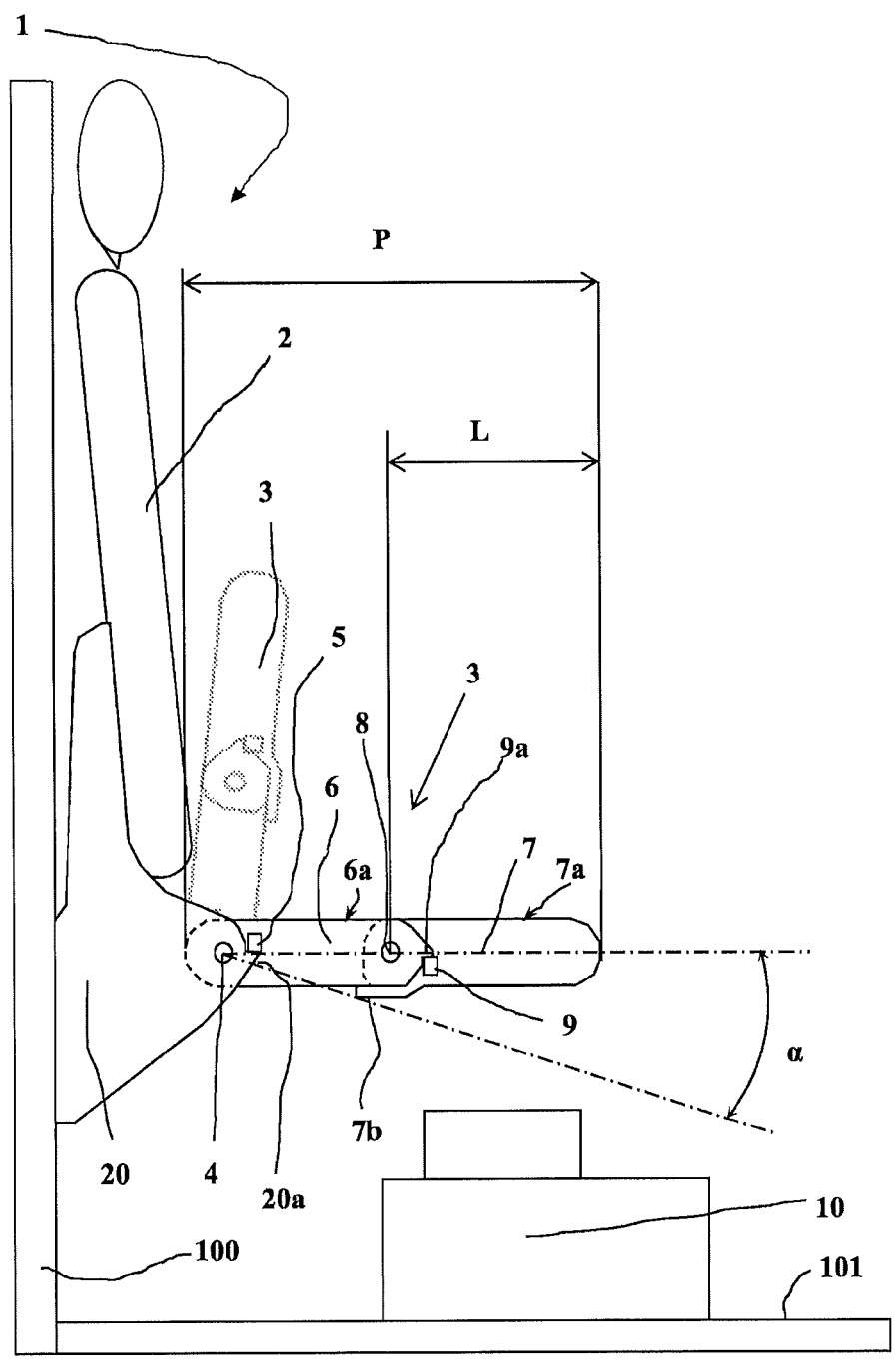
FIG. 1 is a side view of a seat according to the invention in a normal use position.

According to FIG. 1, a seat 1 according to the invention is provided within the passenger compartment of an armoured vehicle (vehicle and passenger compartment not shown) and is attached to a vertical wall 100 of the passenger compartment. The seat 1 includes a back rest 2 and a seating part 3 adapted to pivot with respect to each other via a transverse pivot link 4. As shown in dotted lines in FIG. 1, the seating part 3 can thus be lifted to be positioned along the back rest 2, thereby limiting the bulk volume of the seat when not in use. When the seat is occupied by a passenger, the seating part 3 is lowered into a substantially horizontal position.

The downward course of the lowering movement of the seating part by pivoting is limited by a first stop 5, interfering with a first shoulder 20a, of a support 20 of the seating part attached to the seat 1.

According to FIG. 1, the seating part 3 has two adjacent panels 6 and 7 interconnected by a pivot axis 8 parallel to the pivot link 4. The axis 8 allows the fold-back of the front panel 7 towards the rear panel 6 so as to bring their upper faces 6a and 7a towards each other. The axis 8 also allows the lowering M of the front panel 7 to a position substantially arranged in the same plane as the rear panel 6.

The lowering of the front panel 7 is limited by a retainer 7b abutting below the adjacent rear panel 6. According to a particular embodiment, the fold-back of the front panel 7 towards the rear panel 6 could be prevented by a second stop 9 interfering with a second shoulder 9a. It can be noted that the seating part 3 is arranged at a distance from the floor 101 of the vehicle. For illustration of the operating principle of the invention, objects 10 occupy the space between the seating part 3 and the floor 101.

It can be noted, when the seating part 3 of the seat pivots following the breaking of the first stop 5, and if the front 7 and rear 6 panels remain in line with each other, that the objects 10 block the pivoting of the seating part beyond an angle α which is reduced. The protecting effect of the first stop cannot be entirely applied.

Figure 2:
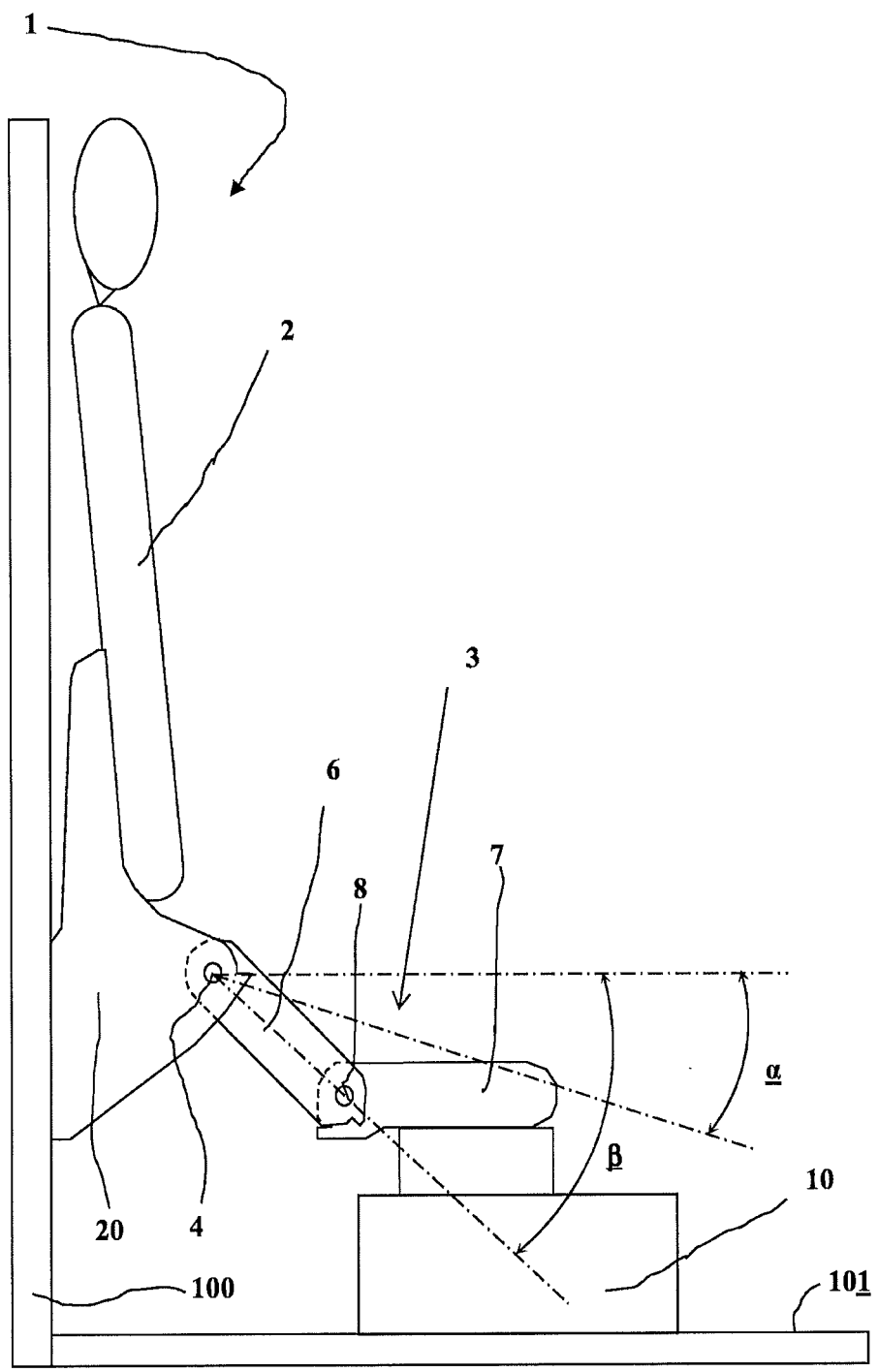
FIG. 2 is a side view of a seat according to the invention in a lowered position following an impact.

According to FIG. 2, the seat 1 is shown in the configuration obtained after a strong impact is applied under the floor, namely a mine type impact. The mass represented by a passenger of the seat (passenger not shown) exerted, under the effect of the impact, a vertical stress such that the first stop 5 collapsed.

Thanks to the pivot axis 8 and to the separation of the seating part into two panels 6 and 7, the seating part 3 pivots and the front panel 7 can also pivot with respect to the rear panel 6. Thus, the objects 10 no longer limit the pivoting of the seating part 3 to the angle α. The seating part 3 can pivot by an angle β greater than the angle α, thereby not limiting the lowering of the seating part and ensuring the protection of the passenger occupying the seat.

According to the example shown in FIGS. 2 and 3, the front panel 7 of the seating part 3 is caused to hit the objects 10 arranged below the seating part 3. In some cases not shown, it can be caused to hit the floor 101 of the vehicle.

Under the effect of the interference with the objects 10 or the floor, the front panel 7 is folded back towards the rear panel 6 by rotating about the axis 8.

According to a particular embodiment, the second stop 9 is caused to collapse under the effect of the weight of the passenger in combination with the support of the plate on the objects 10 arranged on the floor.

It can be noted that the use of a second stop 9 is not mandatory, but the use thereof will improve the capacity to absorb the energy of the impact. This absorption capacity can be completed or entirely ensured by an elastically or plastically deformable component such as a torsion bar acting as an axis 8 between both parts 6 and 7 of the seating part 20.

Similarly, the pivot link 4 can also have an elastically or plastically deformable component such as a torsion bar to optimize the energy absorption.

The stops 5 and 9 can have pins 5 calibrated to the shear failure. The one skilled in the art can also use elastically or plastically deformable components such as, for example, ball thrusts or solutions comparable to those exposed in the French patent FR2932428. The interest of such means is to absorb a part of the energy of the mine impact.

The seating part 3 can have panels with different sizes, for example the front panel 7 could have a length L representing up to a third of the depth P of the seating part.

Figure 3:
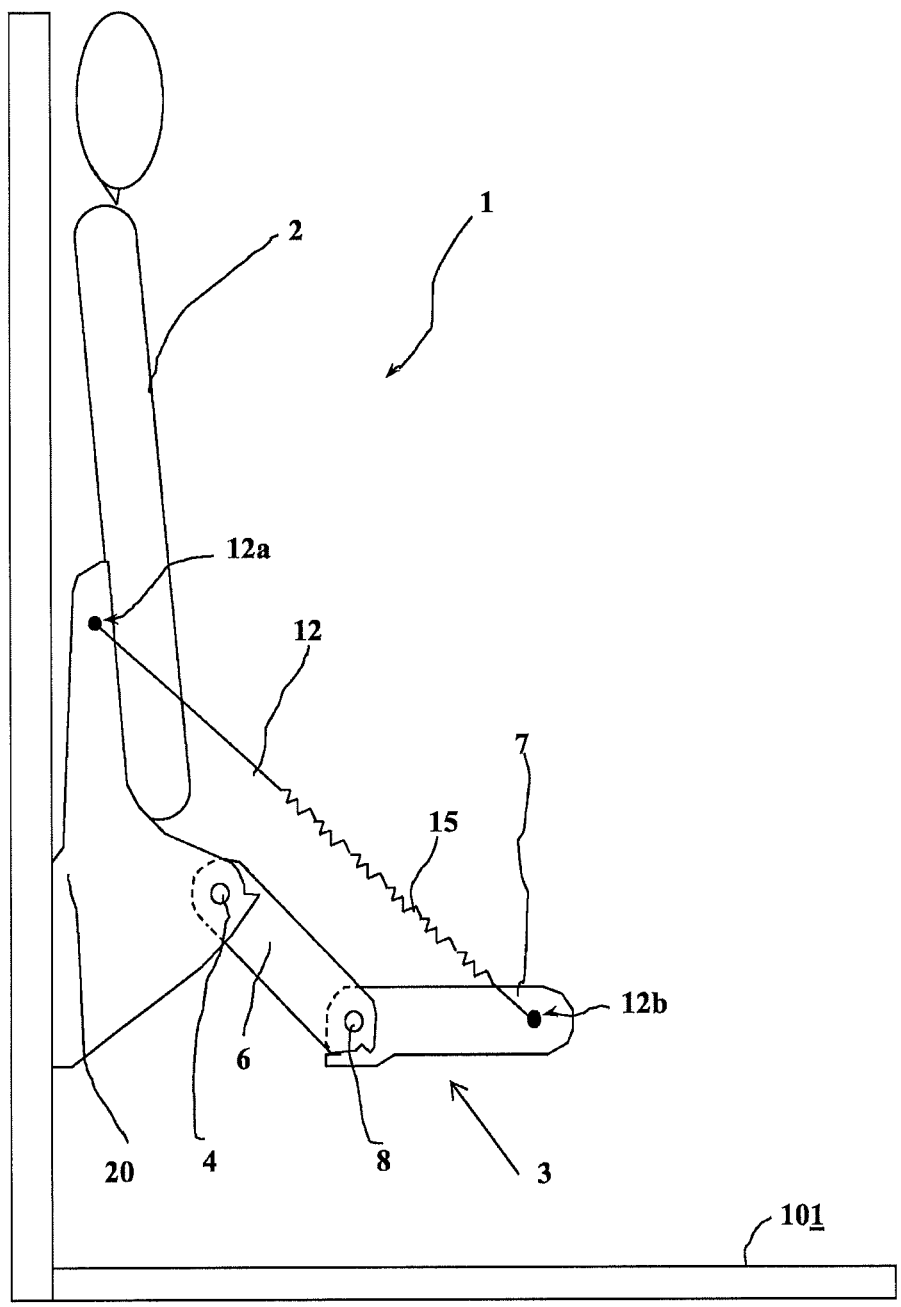
FIG. 3 is a side view of a seat according to an alternative embodiment of the invention, the seat being in a lowered position following an impact.

According to a particular embodiment shown in FIG. 3, the seat 1 has a tie rod 12, mounted between two pivots 12a,12b, and connecting the back rest 2 of the seat 1 to a front part of the front panel 7, such that the front panel 7 remains substantially horizontal during its potential lowering movement following an impact. The tie rod 12 can have a deformable structure 15 to contribute to the absorption of the mine impact. The deformable structure 15 can consist in a textile belt comprising several folds 15 sewed with each other by a tear-calibrated seam.

The invention claimed is:

1. A seat for a vehicle comprising a seating part pivoting about a pivot link, the pivot link allowing the seating part to be lowered into a substantially horizontal position or lifted against a back rest, a lowering course of the seating part being limited by at least one first stop that is adapted to release a lowering following an impact, the seat wherein the seating part comprises at least two adjacent panels adapted to carry out a fold-back movement in relation to each other about an axis parallel to the pivot link between the seating part and the back rest so as to be able to bring upper faces of the panels towards each other.

2. The seat according to claim 1, wherein the seat comprises a second stop impeding the fold-back movement of the panels, the second stop being releasable following an impact to allow the fold-back movement.

3. The seat according to claim 1, wherein the seat comprises restoring means for a front panel of the two panels, the restoring means being adapted to maintain the front panel substantially horizontal.

4. The seat according to claim 3, wherein the restoring means comprises a deformable structure.

5. The seat according to claim 4, wherein the deformable structure comprises a textile belt comprising several folds connected by a tear-calibrated seam.

6. The seat according to claim 1, wherein the axis between both adjacent panels of the seating part comprises a torsion bar.

7. The seat according to claim 1, wherein a front panel of the two panels has a length L lower than or equal to a third of a depth P of the seating part.

\* \* \* \* \*